United States Patent
Mauer et al.

(10) Patent No.: US 8,342,919 B1
(45) Date of Patent: Jan. 1, 2013

(54) METHOD AND APPARATUS FOR CUTTING THE SECOND JOINT OF A POULTRY WING AND PRODUCT THEREFROM

(76) Inventors: James E. Mauer, Rome, GA (US); Benedict DiGerlando, Cedar Bluff, AL (US)

( * ) Notice: Subject to any disclaimer, the term of this patent is extended or adjusted under 35 U.S.C. 154(b) by 0 days.

(21) Appl. No.: 13/493,269

(22) Filed: Jun. 11, 2012

(51) Int. Cl.
*A22C 21/00* (2006.01)

(52) U.S. Cl. .................................................... 452/169

(58) Field of Classification Search ........... 452/135, 452/136, 149–153, 155, 156, 166, 167, 170, 452/187–189
See application file for complete search history.

(56) References Cited

U.S. PATENT DOCUMENTS

| | | | | |
|---|---|---|---|---|
| 4,920,610 A | * | 5/1990 | Callsen et al. | 452/169 |
| 5,490,812 A | * | 2/1996 | Schaarschmidt | 452/138 |
| 5,954,574 A | * | 9/1999 | Verrijp et al. | 452/169 |
| 5,984,770 A | * | 11/1999 | Asano et al. | 452/165 |
| 6,007,416 A | * | 12/1999 | Janssen et al. | 452/135 |
| 6,277,020 B1 | * | 8/2001 | Stephens | 452/135 |
| 6,929,541 B2 | * | 8/2005 | Cervantes et al. | 452/149 |
| 7,335,095 B2 | * | 2/2008 | Sekiguchi et al. | 452/169 |
| 7,341,505 B1 | * | 3/2008 | Gasbarro | 452/169 |
| 7,344,437 B2 | * | 3/2008 | Van Nieuwelaar et al. | 452/187 |
| 7,824,251 B2 | * | 11/2010 | van den Nieuwelaar et al. | 452/185 |

\* cited by examiner

*Primary Examiner* — Richard Price, Jr.

(74) *Attorney, Agent, or Firm* — Stephen J. Stark

(57) ABSTRACT

A conveyor with juxtaposed blocks moves along a path of travel, certain of the blocks have recesses which receive second joints of the wings of poultry. The second joints are arranged sidewise to the path of travel of the conveyor, in the recesses and are successively passed beneath a support frame where a hold down plate and knife is reciprocated as the support frame is towed by the conveyor to cut the flesh and skin between the ulna and radius bones and one or both cartilages, which join the ends of the bones. When cutting a cartilage, the bones are urged apart as the cut is made.

20 Claims, 5 Drawing Sheets

METHOD AND APPARATUS FOR CUTTING THE SECOND JOINT OF A POULTRY WING AND PRODUCT THEREFROM

FIELD OF THE INVENTION

This invention relates to a method and apparatus of parting the second joints of poultry wings and is more particularly concerned with a method and apparatus of slicing the second joint longitudinally so as to cut one or both of the cartilages which connect the two bones of the second joint together.

BACKGROUND OF THE INVENTION

In the past, the second joint of the wing of a fowl has been sliced longitudinally so as to separate this second joint into two separate parts. One prior art machine has semiautomatically severs the second joint so as to separate it into two pieces. This prior art device includes a pair of rotatable discs having opposed inwardly opening recesses, each pair of which receives a second joint of the wing. These two discs are separated by a central spacer plate to provide a circumferential space between the discs, for receiving a stationary knife which is engaged by each wing, as the discs move the second joints in a rotary or orbital path. There is also a cam for automatically ejecting the cut pieces of second joint after such pieces have been severed.

The structure described above, while being capable of severing both of the cartilages which join the ulna and radius bones of the wing together, is slow in operation and requires dexterity on the part of the operator so as to insert the successive second joints into successive opposed pairs of slots as the discs are rotated.

An improvement over the prior art device described above is the subject of U.S. Pat. No. 5,080,631. While that invention provides a much more versatile and easily operated machine over other prior art machines which is believed to be faster and provides a superior job of cutting either one or both cartilages of the second joint, use of that machine over time has led the applicant to realize that improvements over that initial design can be implemented.

SUMMARY OF THE INVENTION

Briefly described, the present invention, which lends itself well to the processing of the second joints of wings of poultry, includes a continuous conveyor which has successive transversely mounted blocks on the outer portion of the conveyor. In one embodiment, each second, third or fourth block is a transportation block provided with an outwardly opening object (second joint) receiving recess or cavity and a transversely disposed knife recess. The operator stands adjacent to the down stream end of the machine and successively places wing joints into the recesses at the up stream end of the upper flight of the conveyor. These second joints are manually positioned transversely of the direction of travel of upper flight of the conveyor and are progressively carried down stream to a cutting zone beneath the cutter assembly.

The cutter assembly is disposed in spaced relationship over the cutting zone in the path of travel of the blocks on the upper flight of the conveyor and has a transverse central wedge-shaped knife which is reciprocated vertically for severing the second joint or other article disposed therebeneath on the transportation block. The knife or guillotine is reciprocated by a central pneumatic cylinder. While this structure has been taught with U.S. Pat. No. 5,080,631, what is not taught or suggested by that reference is the use of a hold down plate which at least assists in trapping the wing portions in the cavities or receiving recesses during the cutting operation. The hold down plate may reciprocate with or independent of the knife in many preferred embodiments. Furthermore, in preferred embodiments, the knife reciprocates through a slot in the plate. Other plate constructions could be used with other embodiments.

With a hold down plate both mid joints as well as pulley bones can be split apart. In order to accomplish this separate receiving recesses or cavities, which could be color coded or otherwise differentiated between the two, can be employed to identify a mid joint cavity or a pulley bone cavity. Furthermore, the new cavities, preferably have a slighter draft or curvature than the prior art designs which had almost perpendicular downwardly extending walls into the recess. The newly configured recesses have an acutely angled, although normally curved wall surface which proceeds downwardly to provide an acute angle from an upper surface of the cavity to assist in defining the cavity, instead of being provided as a perpendicular drop into the cavity from the upper surface.

Disposed on opposite sides of the central pneumatic cylinder are a pair of finger extending pneumatic cylinders which respectively carry fingers which can be extended and retracted by the pistons of the cylinders. When the fingers are extended, they project into side slots or cavities of a transportation block and eventually are engaged by the shoulders which define those cavities. Each transportation block is suitably supported by its end portions on the chains of the conveyor for travelling sidewise along the upper flight of the conveyor. This action can also direct the hold down plate onto the poultry portion for some embodiments. Thus, when the fingers are extended and are engaged by the shoulders of the block, not only is the cutting assembly moved rearwardly (down stream) by the conveyor, at the rate of travel of the conveyor, but the fingers and shoulders automatically align the knife or guillotine with the object to be cut. Thus, after the fingers engage the shoulders, and the cutting assembly is traveling rearwardly with the conveyor, the central air cylinder is actuated to cause the blade to cut down through the hold down plate and object (second joint) carried by the block. When such object is a second joint, the blade or guillotine will initially enter the central portion of the second joint, between the two transversely disposed ulna and radius bones and then cut outwardly so as to sever that portion of the meat between the bones and the one cartilage which join the two bones while the hold down plate holds the joint in the cavity. The knife or guillotine may have a spine or rounded portion which urges the two parts of the second joint apart, pivoting them about the remaining connecting cartilage. The knife may also proceed through a slot in the hold down plate and/or beside the plate during the severing process.

After the momentary reciprocation of the knife or guillotine by the central air cylinder, possibly together with the reciprocation of the hold down plate, the side air cylinders retract the fingers so that the cutting assembly and hold down plate is released from its alignment with a particular transportation block. Spring means return the cutting assembly up stream to its original position where the cycle is repeated for the next subsequent transportation block. The at least partially severed second joints are then successively dumped from the down stream end of the conveyor, as the transportation blocks move to the lower flight of the conveyor. The sequence of events is controlled by an air stepping relay and the conveyor is driven by an air motor. The front end of the conveyor and the cutting assembly are covered to protect the operator and a water spray is directed against successive blocks as they pass from the lower flight to the upper flight for washing any debris therefrom.

In the process carried out, successive spaced transversely disposed second joints are moved along a linear path of travel and are successively cut in a moving cutting zone by the reciprocating blade and thereafter are discharged from the path of travel.

Each second joint is disposed transversely of the path of travel and the blade of the cutting mechanism is also disposed transversely of the path of travel. Furthermore, the hold down plate and the knife or cutting element which cuts the second joint, progressively moves the two bones of the second joint apart as or after the cut progresses so as to bias the bones as the cut is made and then urge them to an open V-shape if only one cartilage is cut. The knife initially enters each second joint intermediate the ends of the second joint and between the two bones and then cuts progressively outwardly for severing one of the end cartilages.

In some embodiment, the knife or guillotine is V-shaped and simultaneously cuts the second joint outwardly in both directions so as to sever both cartilages of the second joint. In some preferred embodiments, the knives are bent along the axes of travel to provide camming surfaces which urge the bones apart and cutting edges which cut at angles through the cartilage.

Accordingly, it is an object of many embodiments of the present invention to provide an apparatus and method of cutting a second joint of a wing of a fowl so as to leave the second joint with only one cartilage connecting the two bones together and so as to arrange the two parts of the second joint in a V-shape.

Another object of many embodiments of the present invention is to provide a semiautomatic apparatus for cutting the second joints of poultry which apparatus is inexpensive to manufacture, durable in structure and efficient in operation.

Another object of many embodiments of the present invention is to provide an apparatus and method of cutting a second joint of poultry so as to separate the second joint into two separate parts, without excessive manual labor.

Another object of the present invention is to provide a method and apparatus for severing a second joint of poultry which method is clean and provides a uniform product.

Another object of many embodiments of the present invention is to provide an apparatus for cutting the second joints of poultry wings which apparatus may effectively perform its cutting operation, regardless of the size of the second joint and will reduce the likelihood that the ulna and radius bones will be cut in the operation.

Another object of the present invention is to provide a novel V-shaped poultry product from the second joint of a chicken or other fowl.

Other objects, features and advantages of the present invention will become apparent from the following description when taken in conjunction with the accompanying drawings wherein like characters of reference designate corresponding parts throughout the several views.

BRIEF DESCRIPTION OF THE DRAWINGS

The particular features and advantages of the invention as well as other objects will become apparent from the following description taken in connection with the accompanying drawings in which.

DETAILED DESCRIPTION

Figure 1:
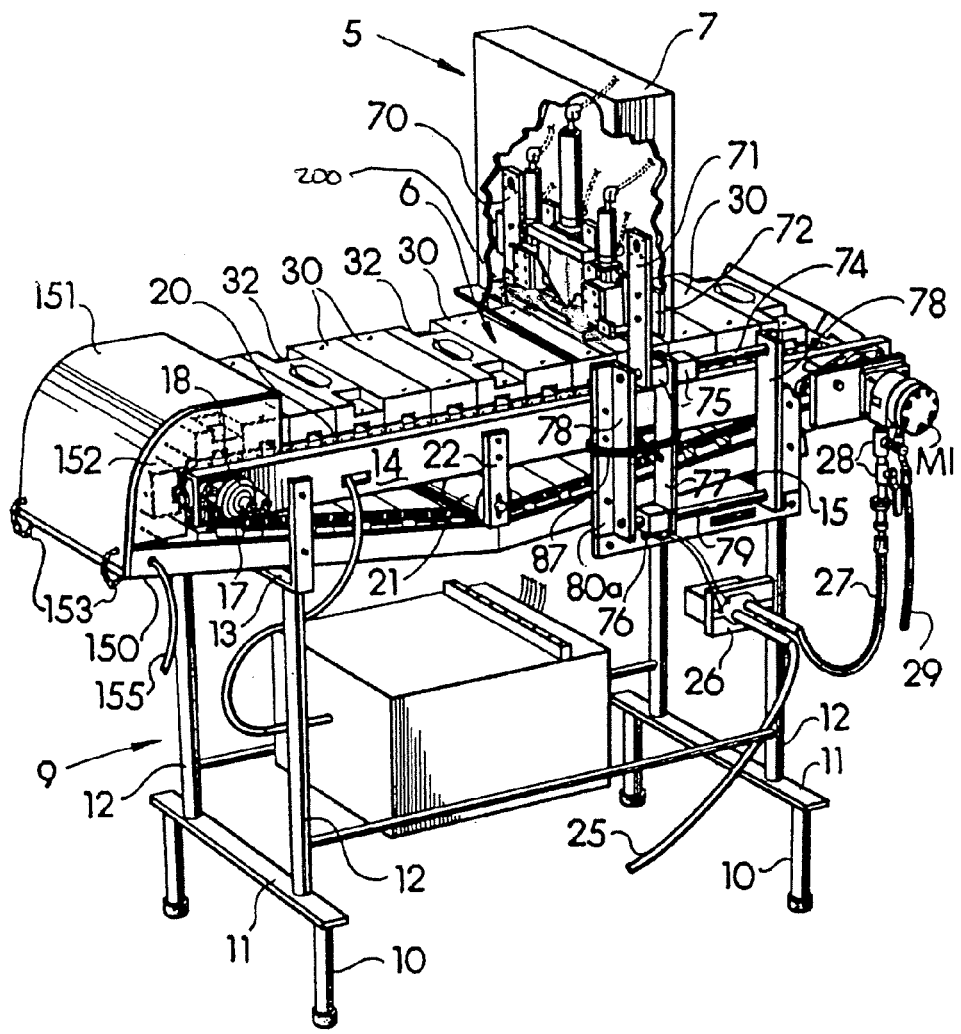
FIG. 1 is a fragmentary perspective view of an apparatus for cutting the second joints of poultry wings, made according to the present invention.

Referring now in detail to the embodiment chosen for the purpose of illustrating the present invention, numeral 9 in FIG. 1 denotes generally the main frame of the apparatus of the present invention, this frame 9 including four upstanding spaced parallel feet 10, the upper ends of pairs of which are joined by transverse bars 11. An upstanding pair of front stanchions 12 is carried by the front bar 11 and support an inverted, U-shaped, transverse, front bracket 13 which, in turn, supports front end portions of longitudinally extending, transversely spaced, parallel, opposed conveyor support rails, such as rail 14. A rear U-shaped bracket 15, on rear stanchions 12 carried by the rear bar 11, provides support for the rear portion of the rails, such as rail 14.

A conveyor assembly 6 is supported on rails 14, conveyor 6 includes a front transversely extending idler conveyor shaft 17 supported between the front end portions of the rails such as rail 14. This idler shaft 17 is appropriately journalled by pillow blocks, such as block 18. A drive shaft (not shown), driven by an air motor M1, in FIG. 1, is journalled at the rear portions of the opposed rails, such as rail 14. Sprockets (not shown) on the spaced shafts, such as shaft 17, support a pair of transversely spaced, opposed, parallel, longitudinally extending continuous conveyor chains, such as chain 20, the continuous chains, being draped around sprockets (not shown) of the shaft which is driven by motor M1.

Transversely extending take-up roll 21 carried by brackets, such as downwardly extending bracket 22, on rail 14 maintains appropriate tautness of the two opposed continuous conveyor chains, such as conveyor chain 20.

The air motor M1 is rotated by compressed air fed from tube 25, via solenoid valve 26, and thence through tube 27 and manual cut-off valves 28 and into motor M1. The discharge line 29 discharges the discharged air from motor M1.

Figure 4:
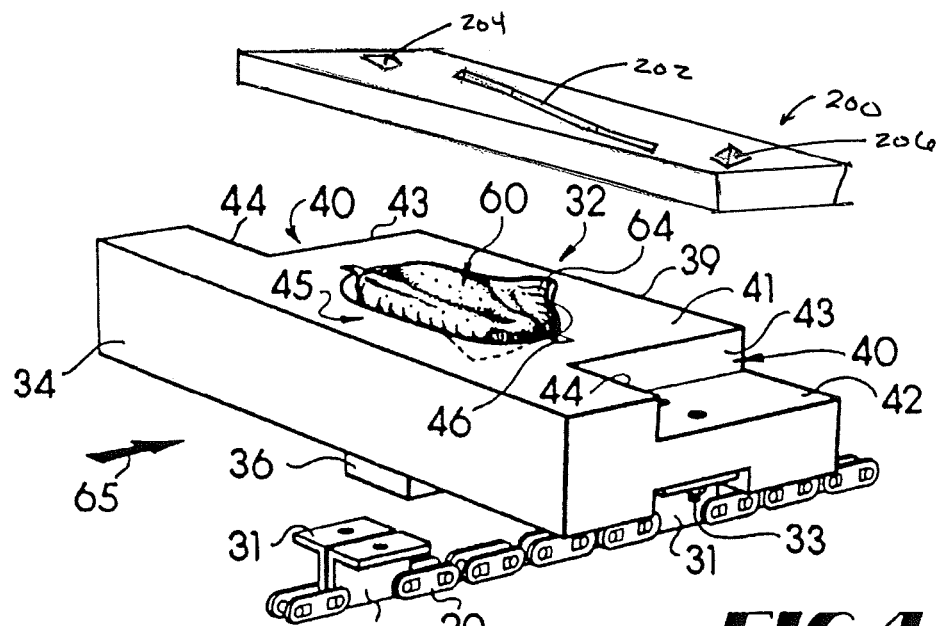
FIG. 4 is an enlarged and exploded perspective view showing a portion of the chain of the conveyor and a transportation block of the conveyor of the machine of FIG. 1, the transportation block containing a second joint of a wing of a fowl, and a holding plate.

Mounted in juxtaposition are a plurality of rectangular spacer blocks 30, each of which is arranged transversely across two conveyor chains 20, the spacer blocks 30 being secured by their bottom portions to the chain by means of opposed pairs of upstanding L-shaped chain brackets 31, seen in FIG. 4. A pair of these brackets 31 back-to-back form a link in the conveyor chain 20.

Between successive pairs of spacer blocks 30 are the transportation blocks 32. Each block 32 has generally a rectangular shape of the same dimensions as the spacer block 30. This block 32 is also mounted by brackets, such as bracket 31, which forms a link in the chain 20, the space between successive brackets 31 being approximately equal to the longitudinal width of the spacer block 30 or block 32. Bolts, such as bolt 33, seen in FIG. 4, secure the transportation block 32 onto pairs of transversely opposed brackets, such as bracket 31 on chains, such as chain 20. The transportation block 32 extends transversely across the pair of chain conveyors, such as conveyor chain 20, and are in longitudinal alignment with the spacer blocks 30, the rear wall 34, of the transportation block 32 being closely adjacent to the front wall of the adjacent spacer blocks 30 when the blocks 30 and 32 are passed along the upper flight of the conveyor. In the central bottom portion of each transportation block 32 is a downwardly protruding cam or cam block 36, seen in FIG. 4. This cam block 36 actuates a control means, such as a pneumatic control valve 37, seen in FIG. 10 and commences one cycle of the machine, as will be described hereinafter.

At the opposed rear corners of each rectangular block 32 there are provided a pair of finger receiving recesses 40 which are formed in the upper surface 41 of the block 32. These recesses 40 are generally rectangular so as to provide upper recess surfaces, such as surface 42, in FIG. 4 and vertical side surfaces 43 which are parallel to each other and are disposed longitudinally with respect to the machine. The recesses 40 are also defined by recess shoulders or walls 44 which have vertical surfaces which are transversely aligned with each other and are spaced rearwardly in the path of travel of the front surface 39 of block 32.

Figure 5:
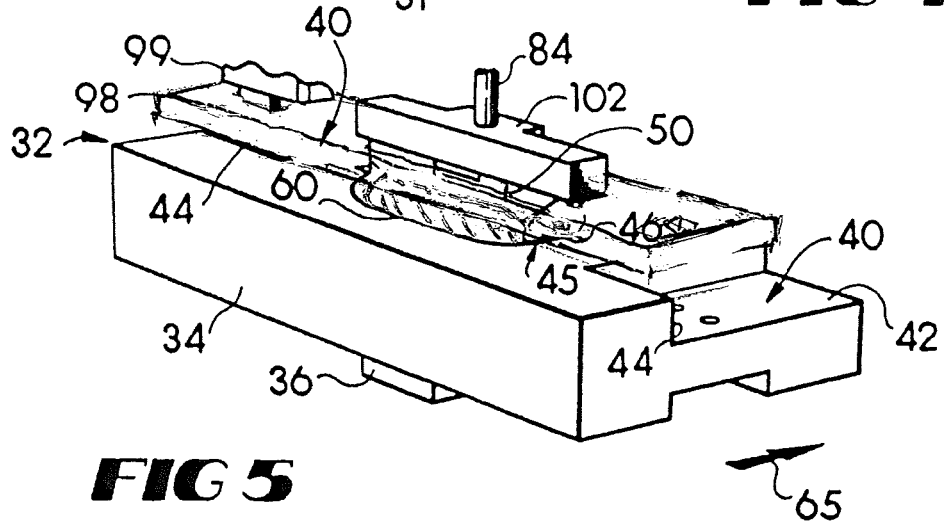
FIG. 5 is a fragmentary perspective view of the transportation block shown in FIG. 4 and illustrating the knife or guillotine in its extended position and one of the fingers in its extended position through the holding plate.

Inwardly of the walls or surfaces 43 of each transportation block 32 is a central, upwardly open, object receiving, recess or cavity, denoted generally by the numeral 45. This recess or cavity 45 is an upwardly open, oval shaped opening which is elongated transversely of the block 32. Cavity 45 has concaved wall surfaces extending downwardly and thence is curved inwardly to form a central cup. Extending in a transverse direction across the cavity 45 and protruding beyond the cavity 45 on both of its sides is a is transverse central, vertically disposed, knife receiving slot 46 which conforms generally to the cross sectional maximum width of the knife or guillotine 50, the transverse knife receiving slot 46 having a depth sufficient to permit full travel of the guillotine 50 downwardly to its most extended position as shown in FIG. 5. Each recess or cavity 45 is of a length greater than the length of the second joint 60 of a wing of a chicken or other fowl.

The term "second joint" means the part of a chicken or other fowl between a drumette of a wing of a chicken or other fowl and the flipper thereof. This second joint 60 has previously been severed from both the drumette and the flipper. Each second joint 60 has an ulna bone 61 and a radius bone 62, shown in FIG. 6, of U.S. Pat. No. 5,080,631 are transversely spaced from each other and which extend essentially parallel to each other within the second joint. The end portions of the ulna and radius bones 61 and 62 are joined by cartilages, such as the cartilage, between the ends of bones 61 and 62. Flesh and skin initially surround these two bones 61 and 62 and the connecting cartilages, the skin being identified by numeral 63 and the flesh by numeral 65, in FIG. 6. Each second joint 60 also includes a web portion 64 which is essentially skin which protrudes from a corner of the second joint 60.

In the present embodiment, the second joint 60, which it is to be cut, is preferably positioned in cavity or recess 45 with the web 64 in the right hand forward corner of the recess 45. The depth of the recess 45, however, is less than the thickness of the second joint 60 and yet will orient the second joint 60 and hold it in its transverse position within the cavity 45, as illustrated in FIG. 4. The depth of cavity 45 may be sufficient to arrest any appreciable forward or rearward movement of the second joint 60 during its transportation in block 32 along the upper flight of the conveyor. The direction of travel of the upper flight of the conveyor is illustrated in FIGS. 4 and 5 by the arrow 65.

Figure 2:
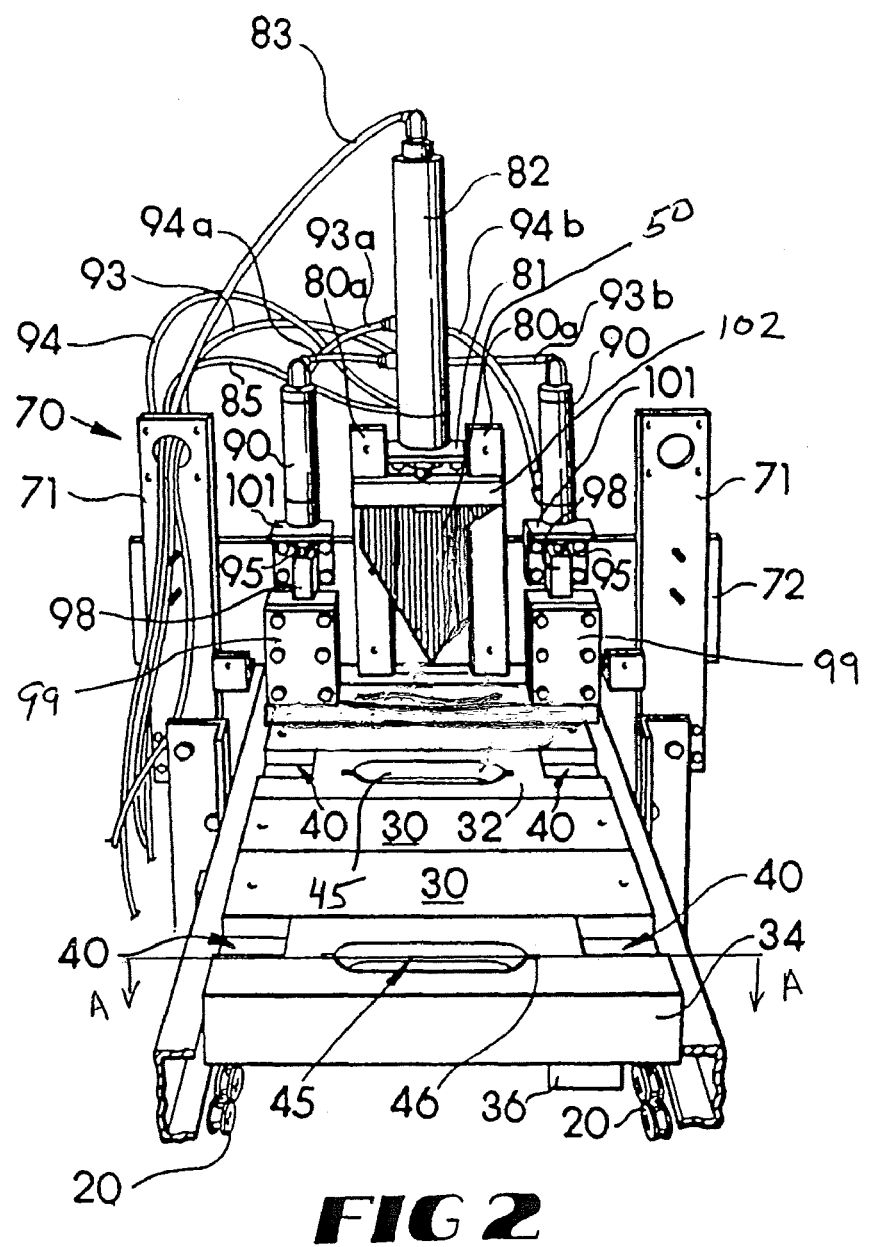
FIG. 2 is an enlarged fragmentary perspective view of a portion of the machine shown in FIG. 1 and showing the knife, holding plate and fingers of the cutting assembly in their retracted positions.
Figure 3:
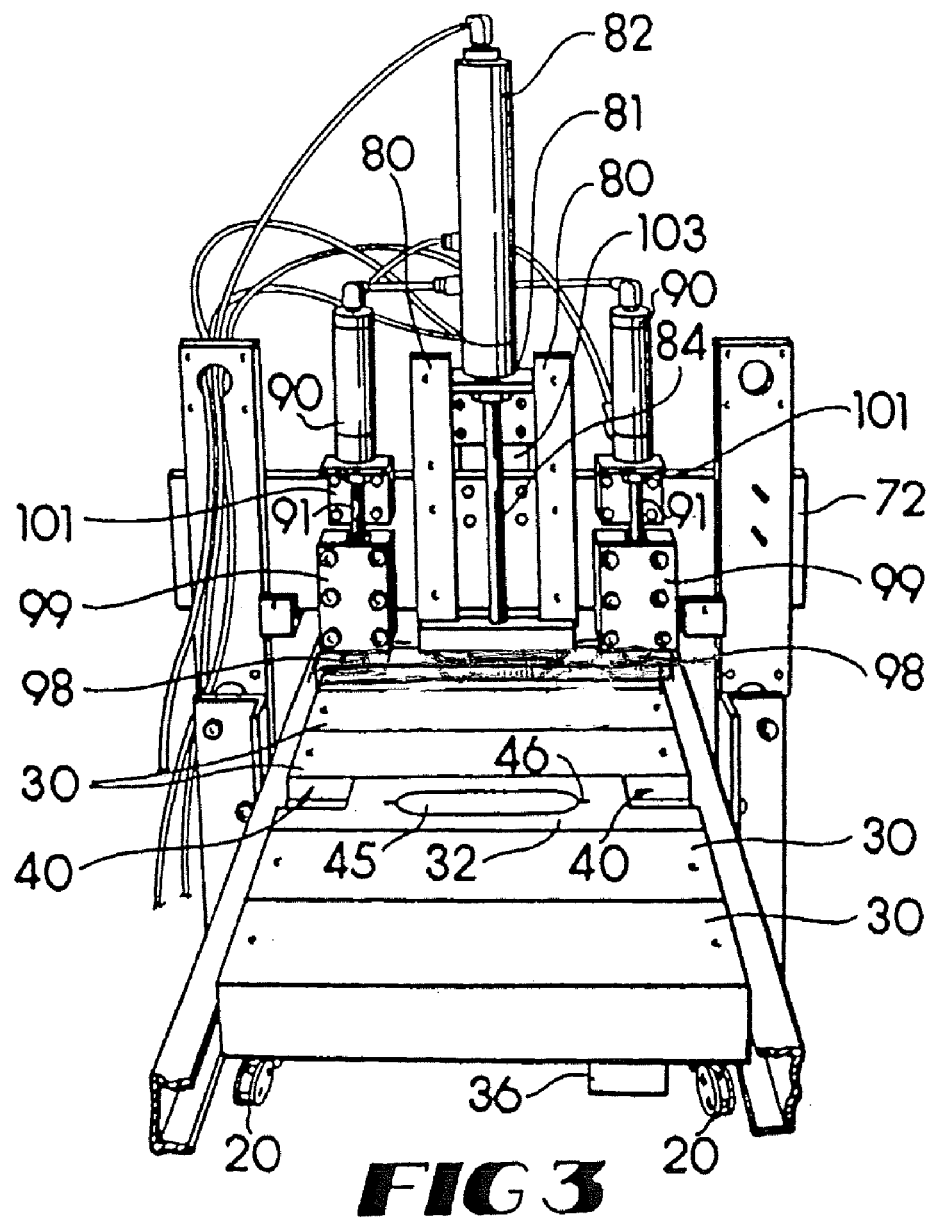
FIG. 3 is a view similar to FIG. 4 but showing the knife, holding plate and the fingers in their extended positions.

In FIGS. 1, 2, and 3 is shown the traveling knife carriage 5 having an upstanding, movable, cylinder support frame, denoted generally by the numeral 70. As best seen in FIGS. 2 and 3, this cylinder support frame 70 includes a pair of transversely opposed, spaced, upright, support members 71, the intermediate portions of which are joined by a vertically disposed, rectangular, transversely extending, mounting plate 72. The lower end portions of the support members 71 are provided with holes through which the longitudinally disposed upper guide bars, such as upper guide bar or rod 74, respectively protrude. The lower end portions of the support members 71 are respectively secured to and carried by a sliding frame, which includes slide blocks, such as slide blocks 75, seen in FIG. 1 and lower blocks, such as lower slide block 76. Each pair of blocks 75 and 76 are joined by a vertically disposed travel bar 77. The lower slide blocks, such as block 76, slide along lower longitudinally extending rods, such as rod 79.

The ends of the rods 74 and 79 on each side of the rods 14 are supported in U-shaped side frames, such as frame 80, each frame having an upstanding pair of opposed brackets 78 which receive the ends of the parallel rods 74 and 79. The U-shaped frames, such as frame 80, are respectively mounted on the longitudinal rails, such as rail 14, so as to dispose the two rods 74 and 79 in spaced, parallel, longitudinally extending, relationship in their frames 80. Thus, the longitudinally extending rods, such as rods 74 and 79, support the moveable frame 70 for reciprocating longitudinal motion, sliding in prescribed paths rearwardly and forwardly with respect to the upper flight of the conveyor, and supporting the mounting plate 72 disposed over the upper flight of the conveyor. Resilient straps, such as strap 87, yieldably urges the moveable frames 80 forwardly to its normal position shown in FIG. 1.

The mounting plate 72 is provided, in its central portion, with a pair of upstanding, parallel, flat, rectangular, piston supporting brackets 80a which are mounted to plate 72 by their lower ends and extend upwardly above the upper edge of the mounting plate 72. These mounting brackets 80a carry a cylinder mounting plate 81, disposed between the upper end portions of the brackets 80a. A central, pneumatic, double acting, knife actuating cylinder 82 is mounted by its lower end on the plate 81. Air is supplied to the upper end of the cylinder 82 via a line or tube 83. When air under pressure is supplied by line 83 to the top of the piston within the cylinder 82, this air extends the piston rod 84. A second pneumatic line 85 supplies air under pressure to the bottom side of the piston within the cylinder 82 to withdraw or retract the piston rod 84. A valve 86 seen in FIG. 10 controls the supplying of air to this double acting cylinder 82. The traveling knife carriage 5 is covered by a removable cover 7.

On opposite sides of cylinder 82, between the upstanding support members 71 and the upstanding brackets 80 are, respectively, a pair of finger or detent actuating cylinders 90. These cylinders 90 are also double acting pneumatic cylinders and have piston rods 91 which are extended and retracted at appropriate times. The cylinders 90 always act simultaneously and may be controlled from a common control valve, air therefrom being supplied to the tops of the pistons, via air line 93 and lines 93a and 93b. Air is supplied to the bottom of the cylinders 90 via air lines 94 and 94a and 94b. Air line 94, however, may be connected to position C of a "knot unit" or air manifold 100.

Piston rods 95 of air cylinders 90 are extended when air is supplied via valve 92 to the tops of the pistons and such piston rods 95 are retracted when this air pressure is relieved and on line 93 via valve 92 and air is applied to the lower sides of the pistons of rods 95 from stepping relay via line 161 to position C of manifold and via position C of manifold and through line 94, 94a, and 94b.

The lower ends of the piston rods 95 are connected to slidable rectangular metal bars which are connected to the end of fingers 98. The fingers 98 are respectively slidably journalled for axial movement within journal boxes 99 which are mounted on the front surface of the mounting plate 72. The lower ends of the pneumatic cylinders 90 are mounted by brackets 101 to the upper portion of the mounting plate 72.

Mounted on the protruding lower end of the piston rod 84 is a knife or guillotine supporting bar 102 which extends transversely between and is slidably confined by the arms 80. The guillotine or knife 50 protrudes downwardly from the supporting bar 102 to a point 105 seen in FIG. 6.

A supporting staff 103, seen in FIG. 3, supports the bracket 81 which, in turn, supports the lower end of the cylinder 82. Thus, the upstanding arms 80 and the bracket 81 are supported quite rigidly with respect to the mounting plate 72.

As shown in FIG. 1, the lower flight of the conveyor is covered by a lower U-shaped pan 150 and the front of the conveyor is covered by a concaved shield or cover 151. The shield 151 has side plates, such as plate 152, which fit over the forward edge portions of the main rails 14. The cover 151 may be readily removed along with it sides 152 by simply lifting the cover 151 and pivoting it in a counterclockwise direction about chains 153 which secure the cover to the pan 150. Water introduced through a hose 155 is sprayed against each of the blocks 30 or 32 as the case may be so that these blocks remain in a clean condition during the operation of the machine.

Figure 6:
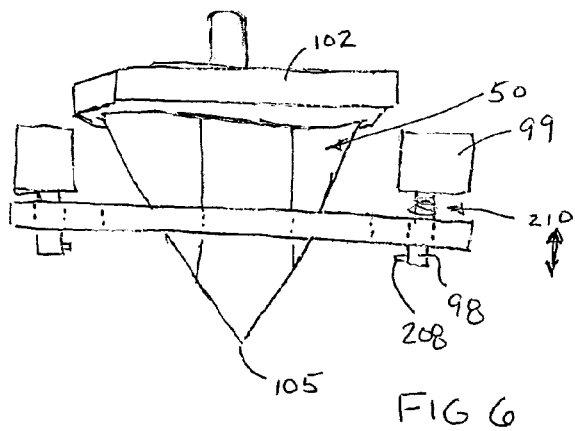
FIG. 6 is a fragmentary perspective view of the knife and holding plate combination.

As best seen in FIG. 6, this knife or guillotine 50 is generally triangular and is formed of sheet metal, high carbon steel. The blade 50 may be substantially flat and have a straight transverse upper edge portion which is firmly secured to a rectangular, transversely extending, support bar or member 102. The support bar 102 may be connected by its central portion to the end of piston rod 84 so that the blade 50 is quite rigidly held in its plane of travel as the piston rod 84 reciprocates the support member 102. Below the support member 102, the blade may have various configurations such as those shown in U.S. Pat. No. 5,080,631, incorporated herein by reference, or other configurations, such as but not limited to those configurations to cut left and right hand portions, respectively.

Pneumatic System

Control valve 37 is mounted in the path of travel of the cam block 36, shown in FIG. 4, so that as the particular transport block 32 approaches the cutting zone of the guillotine 50, the arm of valve 37 is depressed to start a stepping relay.

Numerous control valves (not shown) which are transversely spaced across the bottom of the path of travel of the transportation blocks, can be made selectively operable for selected blades or knives for the machine. Separate control valves may be dictated by different shaped knives, which may also require different transportation blocks, to match the shape of the installed blade. Thus, we the cam blocks, such as block 36, can be positioned in different transverse locations for different transportation blocks, to provide that the correct block, such as block 32, may be selected for the appropriate knife, such as knife or blade 50. Thus, only if the appropriate block with its correctly positioned cam block, such as cam block 36, is in the machine, and the appropriate selector valve can be appropriately set for the particular blade, such as blade 50, so that air can be momentarily supplied to the stepping relay to start its stepping operation.

The fingers 98 can be directed to substantially simultaneously drop into the recesses 40 of the transportation block 30 located therebeneath. With progressive movement of the conveyor chains 20, the transportation block 32 continues its rearward travel, thereby engaging the end portions of the extended fingers 98 in the recesses 40 and where they are engaged by abutting the shoulders 44, as shown in FIG. 5. Thus, the fingers 98 act as detents to accurately align the block 32 and knife 50 and to lock the travel of the carriage assembly for movement with the selected block 32. The timer then steps the stepping relay so that second stage is actuated to supply air to a main central cylinder 82, thereby causing it to extend the piston rod 84, urging the guillotine or knife 50, downwardly.

An operator or operators manually load each of the recesses with a second joint 60 in the manner depicted in FIG. 4, the web portion 64 being disposed at the right hand forward corner. The movement of the knife 50 by the piston 84 extends the knife 50 its full travel into the recess 46 for the knife 50 and thereby causes the knife 50 to slice the second joint 60. This slicing is initiated by the point 105 of the blade, as shown in FIG. 6, this point 105 moving progressively downwardly through the central portion of the second joint so as to pass between the two bones. The blade 50 has a V-shaped cutting system consisting of the cutting edges 104 and 106 which when the knife moves progressively downwardly progressively cuts outwardly until the blade 104 severs the outer cartilage and spine 108 spreads the two bones apart.

It is therefore seen that the sequence of events take place in which initially the fingers 98 can be extended so as to be received in the recesses 40. Then, after an appropriate time delay, the guillotine 50 is actuated to extend piston rod 84 and its knife or guillotine 50. After it has travelled fully down, the relay then permits the fingers 90 to be withdrawn and thereafter the piston rod 84 to be withdrawn. Thus, the fingers hold the block 32 in alignment while the knife or guillotine 50 cuts the second joint 60 and all piston rods 95 and 84 are withdrawn to permit the repeat of the next cycle, when the cam block 36 of the next transportation block 32 actuates valve 37 a second time in a subsequent operation.

If desired, the two spacer blocks 30 may be replaced with a single spacer block so that each alternate block is a transportation block 32. This will speed up the machine without increasing the speed of the conveyor. Furthermore, after each cycle, the resilient members 87 return the traveling frame to its original position for a subsequent operation.

During the entire time that the fingers 98 are extended and are received in the recesses 40, the traveling knife carriage 5 travels at the same speed as the conveyor assembly 6; however, when the fingers 98 are retracted, the resilient members 87 may return the entire carriage 5 to its original position as shown in FIG. 1.

In the processing of chicken (poultry) it is believed to be an easy matter to accumulate the left second joints and the right second joints in separate containers (not shown). Thus, it is recommended that separate machines 9 or cavities 45 can be used for processing left hand second joints and right hand second joints so that camming pressure is applied to an intermediate portion of the larger ulna bone and the severing force of the blade is applied angularly to the cartilages at the junctions of the ulna 61 and radius 62. This applies some transverse force to tend to spread the two bones apart before cutting one or both cartilages.

On a single lane machine which could have alternate or differently configured transportation blocks 32, for example, and/or in place of any spacer blocks, such as blocks 30, the appropriate turning of the handle of valve could select the particular transportation block which should be used for the appropriate blade installed in the machine. Other embodiments may be multiple lane machines having multiple cavities proceeding past multiple knives, such as parallel arrangements or other configurations.

A test machine has indicated that about 72 second joints per minute may be readily processed with a machine of the present invention. This can be doubled if the cavities 45 are in side by side relationship, etc.

Figure 9:
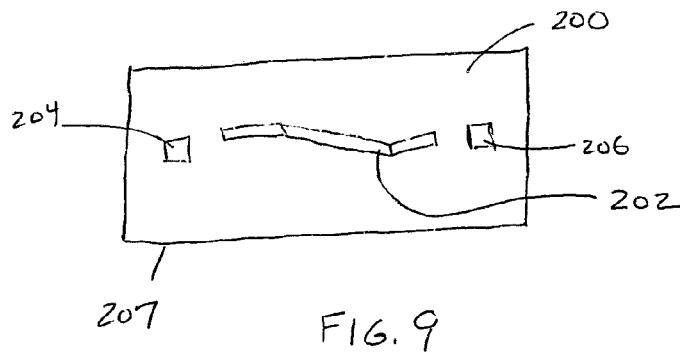
FIG. 9 is a top plan view of the holding plate shown in other figures.

FIG. 1 also shows hold down plate 200. As can better be seen with reference to FIG. 9, hold down plate 200 has a slot 202 which can receive the knife 50 therethrough during operation, although other hold down plates may cooperate in other ways to allow the knife 50 to conduct its reciprocal operation. Bores 204,206 may allow for the fingers 98 to pass through the hold down plate, at least for some embodiments as well. In fact, as can be seen relative to a design with reference to FIG. 6, the blade 50 passes through the slot 202, and the fingers 98 pass through the bores 204,206.

Some embodiments may have retainers 208 which can assist in preventing the hold down plates 200 from disengaging the fingers (i.e., so that the fingers 98 can retract the hold down plates 200 when not in use). Furthermore, some embodiments may have springs 210 or other agents which can assist in directing the hold down plates above the cavities 45 (and thus above the poultry portions), to assist in retaining the poultry in the cavities, and more importantly, for at least some embodiments, assist in maintaining the bones of the poultry in a desired position so that the knife 50 can be directed in a desired location relative to the poultry portion 60.

Other designs may have other hold down plate configurations and designs. As shown in FIG. 5, the hold down plate 200 directs a pressure atop the second joint 60 by direct contact of a lower surface of the plate 200 in the preferred embodiment. The joint 60 is thus held in the cavity 45 during at least the cutting operation. The knife 50 then reciprocates in the cutting operation at least partially through the slot 202 and the joint 60 as described above. The slot 202 is illustrated as bounded by a perimeter of the plate 200 or at least internal thereto.

After making the cut with knife 50, the fingers 98 retract thus retracting the hold down plate 200 away from the at least partially cut portion 50. In a preferred embodiment, the hold down plate 200 is removed from contact with the joint 60 during this step as the conveyor continues movement of the cut joint 60 away from the cutting zone.

In operation, the hold down plate 200 will contact the top of the second joint 60 prior to completing, or possibly beginning the cutting operation with the knife 50. The contact could also be somewhat simultaneous. With the second joint 60 secured with the hold down plate 200, the knife 50 can then reciprocate through the joint 60 and the hold down plate 200 can either be removed before the removal of the knife 50 or after the knife 50 depending on the embodiment selected. In the illustrated embodiment, the hold down plate 200 is moved away from the joint 60 with the removal of the fingers 98 which cooperate with the block 32 during cutting. Other embodiments may function differently.

Furthermore, hold down plates 200 may be configured differently than the illustrated plate. Some plates 200 may work independently of the fingers 98 and it may be possible that the knife 50 passes by the hold down plate 200 instead of through slot or slots 202 through the hold down plate 200 as illustrated. Multiple hold down plates 200 may be utilized either with a single joint or multiple joints 60.

Figure 7:
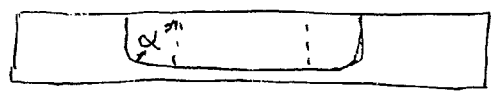
FIG. 7 is a cross sectional view of a prior art cavity in a transportation block.
Figure 8:
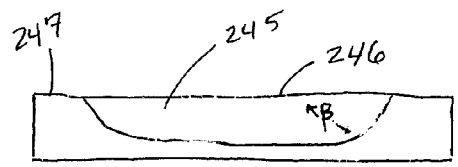
FIG. 8 is a cross sectional view of a transportation block of the present invention as taken along the line A-A of FIG. 1.

FIG. 8 can be contrasted with FIG. 7 to show different cavity construction possibilities of the prior art design of FIG. 7, which can be used with some embodiments of this invention, as well as an improved cavity 245. The improved cavity 245 has an acute angle B, which is less than 90 degrees from upper surface 246 of the cavity 245 coplanar with surrounding upper surface 242, as opposed to acute angle A shown in FIG. 7 which is initially perpendicular to an upper surface. This slighter draft, which may still be curved, or alternatively planar, has been found helpful for at least some embodiments. The angle B is presently about 75 degrees, but could be initially 45 degrees or other appropriate acute angle less than about 80 degrees for at least some embodiments. The acute angle B, particularly when combined with the hold down plate, has been found to increase the speed of loading, and the accuracy of the placement of the joint 60 by operators, particularly at higher speeds of operation.

It will be obvious to those skilled in the art that many variations may be made in the embodiment here chosen for the purpose of illustrating the present invention, without departing from the scope thereof as defined by the appended claims.

We claim:

1. A machine for cutting a second joint of a poultry wing, said second joint having spaced ulna and radius bones, the ends of which are joined by cartilages and flesh around to said bones, comprising:
   a cutting zone;
   a cutting element and a hold down plate disposed adjacent to said cutting zone;
   a conveyor supporting said second joint in a transverse position and configured to move said second joint sidewise along a longitudinal path of travel to and from said cutting zone;
   said cutting element having a generally flat transversely disposed knife disposed generally perpendicular to said longitudinal path configured to be aligned with the second joint and moved toward said cutting zone while said knife is aligned with said second joint and while said hold down plate is at least assisting in retaining the second joint in the cutting zone, and then urging said knife progressively into and through said flesh, between said spaced bones and through at least one of said cartilages while holding the second joint with the hold down plate, and then returning the knife to its position adjacent to said cutting zone after cutting.

2. The machine defined in claim 1 wherein said hold down plate is retracted away from the second joint after cutting.

3. The machine defined in claim 2 wherein said hold down plate is retracted with fingers after cutting.

4. The machine defined in claim 3 wherein said fingers cooperate to engage a block in the cutting zone during cutting.

5. The machine defined in claim 1 wherein said conveyor includes a flexible endless conveyor having an upper flight for receiving successive second joints and lower flight, and means for moving said endless conveyor along a prescribed path of travel for passing the upper flight of said conveyor through said cutting zone with blocks having cavities acutely angled at their upper surfaces relative to a plane extending above the cavities coplanar with an upper surface of the blocks.

6. The machine defined in claim 1 wherein said hold down plate contacts the second joint before the knife contacts the second joint.

7. The machine defined in claim 1 wherein the hold down plate further comprises a slot internal to a plate perimeter and the knife passes through the slot during reciprocation.

8. The machine defined in claim 7 when the slot has a perimeter which is completely internal to the hold down plate.

9. A machine for cutting a second joint of a poultry wing, said second joint having spaced ulna and radius bones, the ends of which are joined by cartilages and flesh around to said bones, comprising:
- a cutting zone;
- a hold down plate and a cutting element disposed adjacent the cutting zone;
- a conveyor for moving said second joint to and from said cutting zone, said conveyor having a flexible endless conveyor having an upper flight for receiving successive second joints and lower flight, means with said conveyor moving along a prescribed path of travel passing the upper flight of said conveyor through said cutting zone;
- wherein said cutting element is directed along a prescribed path of travel toward said cutting zone to urge said cutting element progressively into and through said flesh, between said spaced bones and through at least one of said cartilages, and thereafter said cutting element is returned to its position adjacent to said cutting zone; and
- wherein said hold down element is directed along a prescribed path towards cutting zone contacting an upper surface of the second joint without penetrating the second joint at least during cutting with the cutting element; and
- means for moving said cutting element along a second path of travel of said upper flight as said cutting element is moved in its path of travel toward and away from said cutting zone.

10. The machine defined in claim 9, wherein said cutting element comprises a reciprocatable knife arranged transversely of said prescribed path of travel, and an endless conveyor having a generally horizontal upper flight, said conveyor having a transportation means thereon provided within recess for receiving said second joint oriented in a prescribed position with respect to said upper flight.

11. The machine defined in claim 10 wherein said recess is elongated transversely of the path of travel of said conveyor for orienting said second joint in a position transversely of the direction of movement of said upper flight, and said cutting element is a knife reciprocated toward and away from said transportation means when said block is in said cutting zone; and
- wherein the hold down plate has a slot internal to the hold down plate and the knife reciprocates through the slot during operation.

12. The machine defined in claim 9 wherein said conveyor means includes a flexible endless conveyor having an upper flight for receiving successive second joints and lower flight, and means for moving said endless conveyor along a prescribed path of travel for passing the upper flight of said conveyor through said cutting zone with blocks having cavities acutely angled at their upper surfaces relative to a plane extending above the cavities coplanar with an upper surface of the blocks.

13. The machine defined in claim 9 wherein the hold down plate further comprises a slot bounded by a plate perimeter and the knife passes through the slot during reciprocation.

14. The machine defined in claim 13 when the slot has a perimeter which is completely internal to the hold down plate.

15. A machine for cutting a second joint of a poultry wing, said second joint having spaced ulna and radius bones, the ends of which are joined by cartilages and flesh around to said bones, comprising:
- a cutting zone;
- a cutting element disposed adjacent to said cutting zone;
- a conveyor for supporting said second joint to and from said cutting zone;
- wherein said cutting element is moved along a prescribed path of travel toward said cutting zone to urge said cutting element progressively into and through said flesh, between said spaced bones and through at least one of said cartilages, and then returned to its position adjacent to said cutting zone after cutting the second joint; and
- a frame for supporting said knife in its position adjacent to said cutting zone;
- and a hold down plate operably coupled to the frame at least assisting in retaining the second joint to the conveyor from above during cutting without penetrating the second joint.

16. The machine defined in claim 15 wherein said hold down plate reciprocates relative to the second joint.

17. The machine defined in claim 15 wherein said frame is operably coupled to a movable finger, said finger moved toward and away from said conveyor during operation, said conveyor having a recess which receives said finger when said finger is extended with said finger moved toward and away from the path of travel of said conveyor.

18. The machine defined in claim 17 wherein the hold down plate is operably coupled to the finger.

19. The machine defined in claim 18 wherein said conveyor includes an endless conveyor having an upper flight for carrying successive second joints along said upper flight, means for orienting said second joints in transversely disposed relationship to the path of travel of said upper flight, said cutting element including a reciprocatable pointed knife and said pointed knife successively cuts said second joints when each of said second joints is disposed in said cutting zone and means for moving said knife at the speed of said conveyor as said knife is reciprocated.

20. The machine defined in claim 15 wherein said conveyor includes a flexible endless conveyor having an upper flight for receiving successive second joints and lower flight, and means for moving said endless conveyor along a prescribed path of travel for passing the upper flight of said conveyor through said cutting zone with blocks having cavities acutely angled at their upper surfaces relative to a plane extending above the cavities coplanar with an upper surface of the blocks.

\* \* \* \* \*